(12) United States Patent
Hung et al.

(10) Patent No.: US 7,147,515 B1
(45) Date of Patent: Dec. 12, 2006

(54) DUAL CARD TYPE CONNECTOR

(75) Inventors: Kun-Ming Hung, Taoyuan (TW); Jason Huang, Dasi Township, Taoyuan County (TW)

(73) Assignee: Proconn Technology Co., Ltd., Bade (TW)

( * ) Notice: Subject to any disclaimer, the term of this patent is extended or adjusted under 35 U.S.C. 154(b) by 191 days.

(21) Appl. No.: 11/058,452

(22) Filed: Feb. 14, 2005

(51) Int. Cl.
*H01R 24/00* (2006.01)

(52) U.S. Cl. .................................... 439/630
(58) Field of Classification Search ................ 439/630, 439/637, 945, 946; 361/737, 752, 796
See application file for complete search history.

(56) References Cited

U.S. PATENT DOCUMENTS

| | | | | |
|---|---|---|---|---|
| 6,097,605 A * | 8/2000 | Klatt et al. | ................ | 361/737 |
| 6,482,029 B1 * | 11/2002 | Nishimura | ............... | 439/541.5 |
| 6,524,137 B1 * | 2/2003 | Liu et al. | .................... | 439/638 |
| 6,716,066 B1 * | 4/2004 | Kuo | ........................... | 439/630 |
| 6,761,313 B1 * | 7/2004 | Hsieh et al. | ................ | 235/451 |
| 6,783,399 B1 * | 8/2004 | Joung | ........................ | 439/630 |
| 6,821,155 B1 * | 11/2004 | Hsieh | ......................... | 439/630 |

* cited by examiner

*Primary Examiner*—Alexander Gilman
(74) *Attorney, Agent, or Firm*—Pro-Techtor Int'l Services (57) ABSTRACT

A dual card type connector includes an insulating body having a first surface on a side thereof. First pins are mounted to the first surface. The insulating body further includes a second surface on the side thereof. Second pins are mounted to the second surface. A cover is mounted to the insulating body. The cover and the first surface of the insulating body together define a first insertion space for releasable engagement with a first electronic card. The cover and the second surface of the insulating body together define a second insertion space for releasable engagement with a second electronic card having a size different from that of the first electronic card. Thus, the dual card type connector can be used with a long, wide card or a short, narrow card without increasing the size of the connector.

4 Claims, 12 Drawing Sheets

DUAL CARD TYPE CONNECTOR

BACKGROUND OF THE INVENTION

1. Field of the Invention

The present invention relates to a connector. In particular, the present invention relates to a dual card type connector that can be selectively used with either one of two different types of electronic cards.

2. Description of the Related Art

An electronic card, such as an SMC (smart media card), XD card (XD-picture card), etc. is usually coupled to an electronic device via a connector. However, these electronic cards are of different sizes such that connectors of different sizes are needed and that the connectors occupy the interior space of the electronic device.

Figure 1:
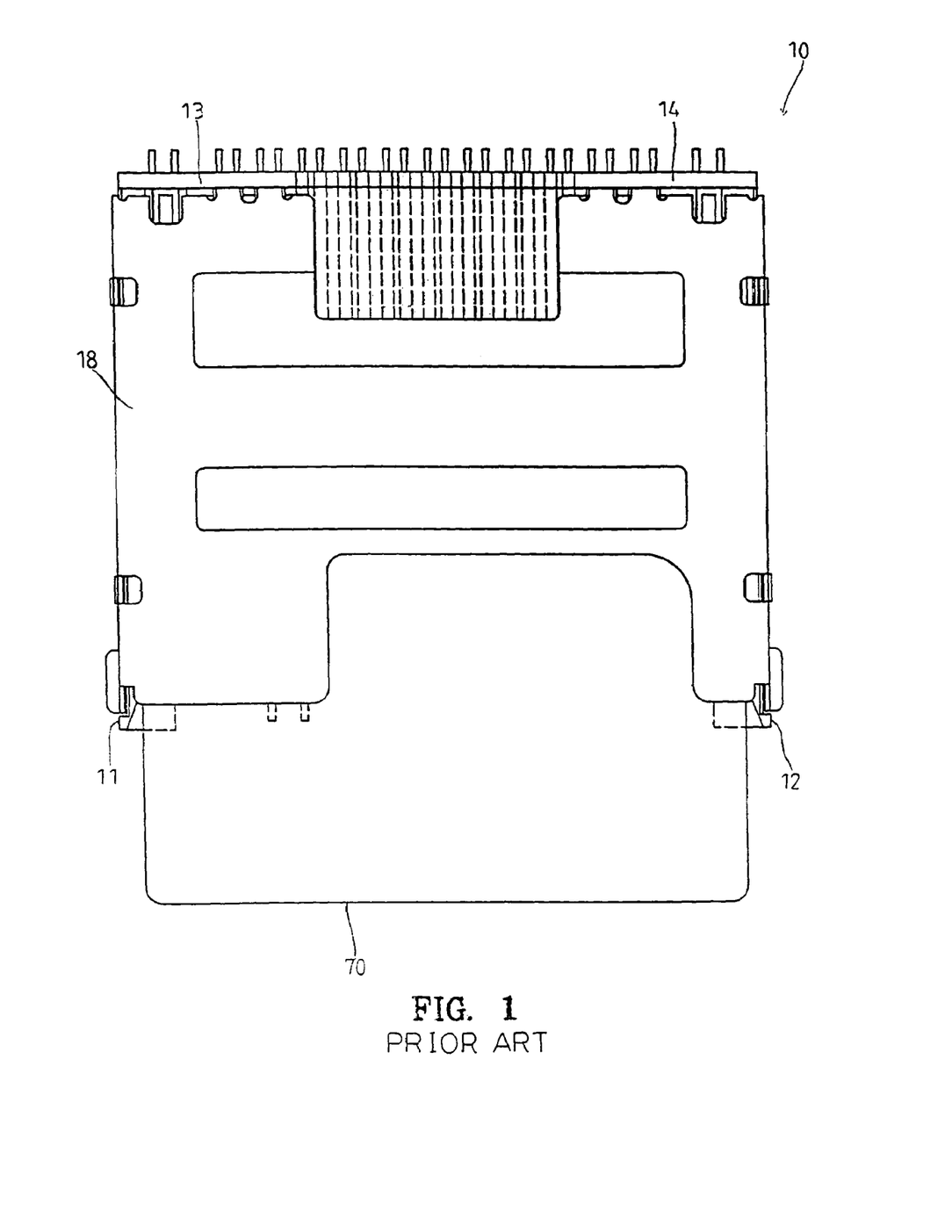
Figure 2:
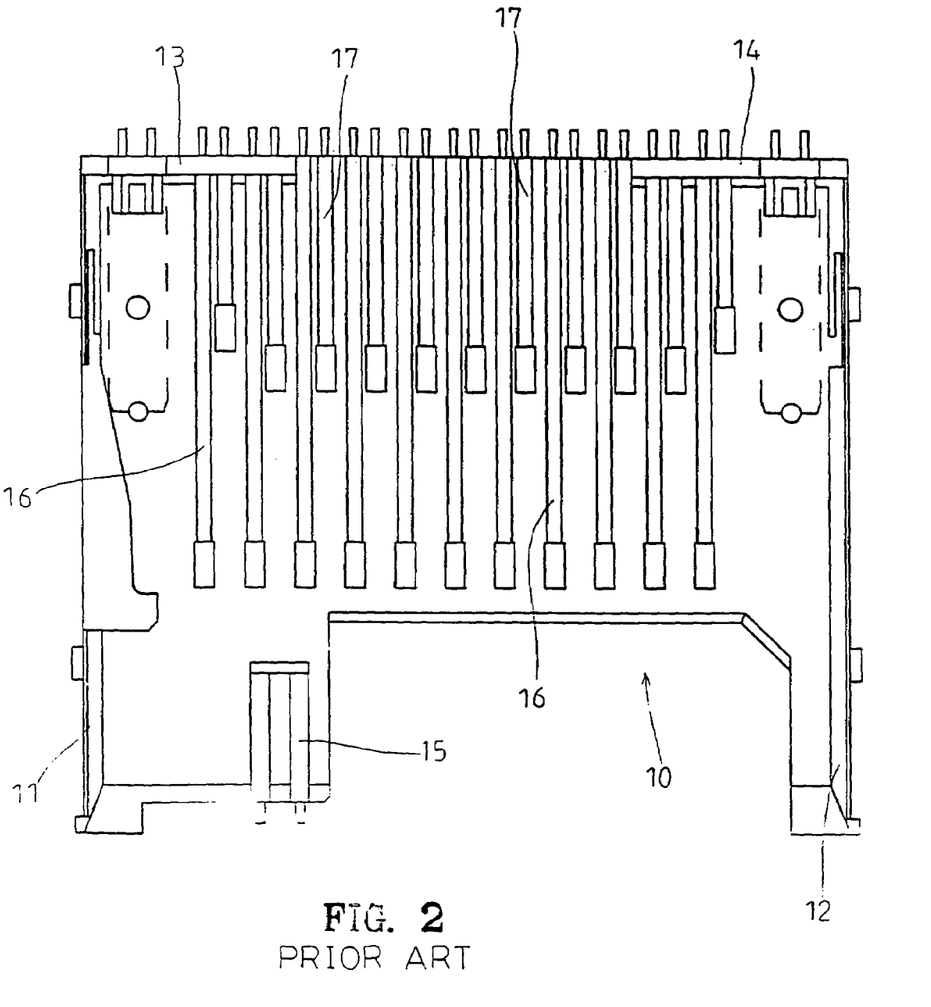
FIG. 2 is a plan view similar to FIG. 1, wherein a metal cover of the SMC connector is removed.

FIG. 1 is a plan view of a conventional SMC connector, wherein an SMC is plugged in. FIG. 2 is a plan view similar to FIG. 1, wherein a metal cover of the SMC connector is removed. The SMC connector includes an insulating body 10 having left and right side racks 11 and 12 and rear stop walls 13 and 14. Left side pins 15 and two rows of alternately disposed pins 16 and 17 are mounted on the insulating body 10, and a metal cover 18 is then mounted on top of the insulating body 10, forming an insertion space that has an opening facing a front of the insulating body 10. An SMC 70 can be plugged into the insertion space.

However, such a connector can only be used with an SMC 70 that is relatively long and wide; namely, it cannot be used with other electronic cards having different sizes, such as an XD card that is relatively short and narrow.

SUMMARY OF THE INVENTION

An object of the present invention is to provide a dual card type connector that can be selectively used with either one of two different types of electronic cards. In an embodiment of the invention, the dual card type connector can be used with either a relatively long, wide SMC or a relatively short, narrow XD card.

A dual card type connector in accordance with the present invention includes an insulating body having a first surface on a side thereof. A plurality of first pins are mounted to the first surface. The insulating body further includes a second surface on the side thereof. A plurality of second pins are mounted to the second surface. A cover is mounted to the insulating body. The cover and the first surface of the insulating body together define a first insertion space for releasable engagement with a first electronic card. The cover and the second surface of the insulating body together define a second insertion space for releasable engagement with a second electronic card having a size different from that of the first electronic card.

Thus, the dual card type connector in accordance with the present invention can be used with a long, wide card or a short, narrow card without increasing the size of the connector.

Other objects, advantages, and novel features of the invention will become more apparent from the following detailed description when taken in conjunction with the accompanying drawings.

BRIEF DESCRIPTION OF THE DRAWINGS

FIG. 1 is a plan view of a conventional SMC connector, wherein an SMC is plugged in.

FIG. 7 is a view similar to FIG. 3, wherein an SMC card is plugged in.

FIG. 9 is a view similar to FIG. 3, wherein an XD card is plugged in.

DETAILED DESCRIPTION OF THE PREFERRED EMBODIMENTS

Figure 3:
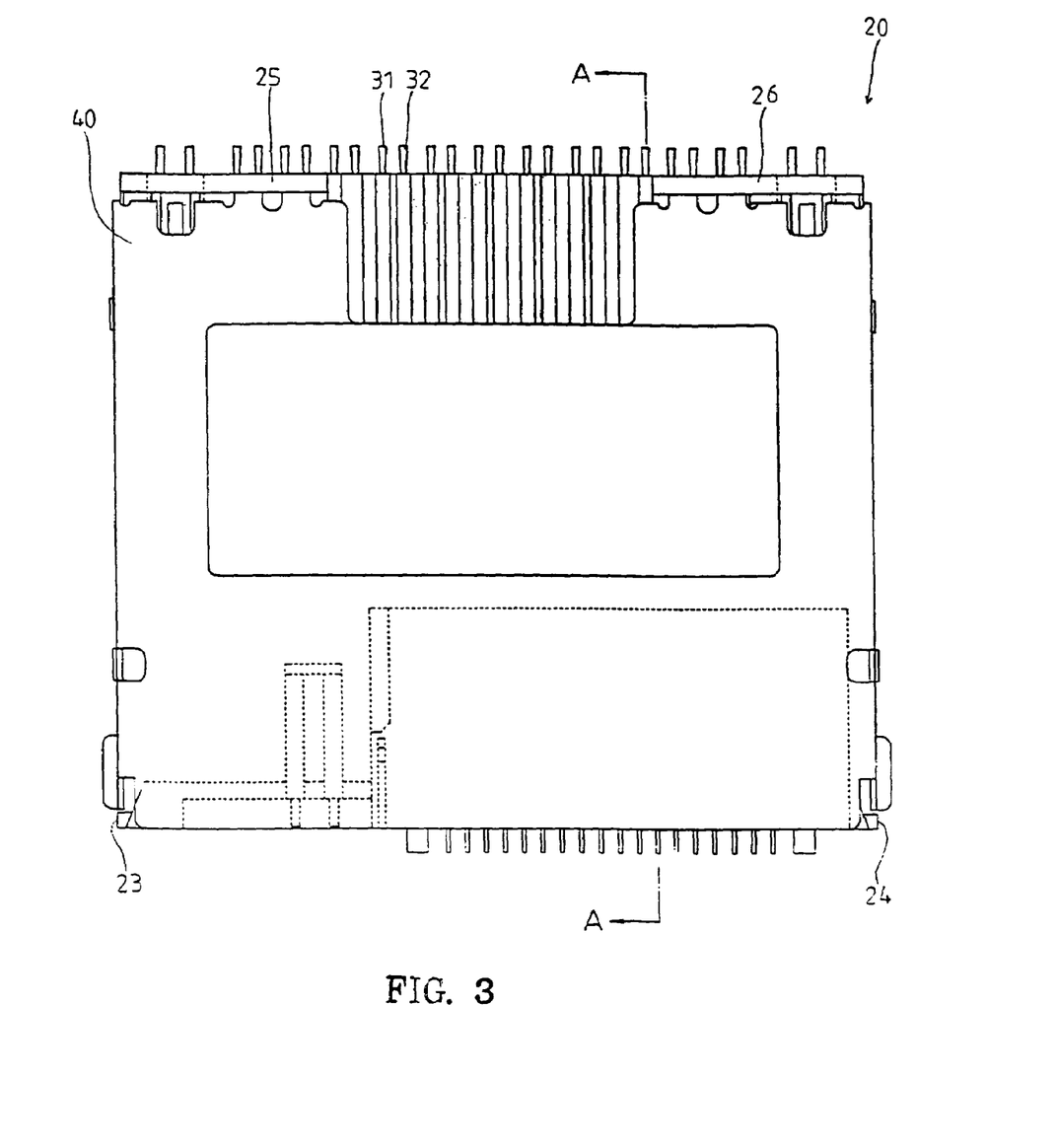
FIG. 3 is a plan view of a dual card type connector in accordance with the present invention.
Figure 4:
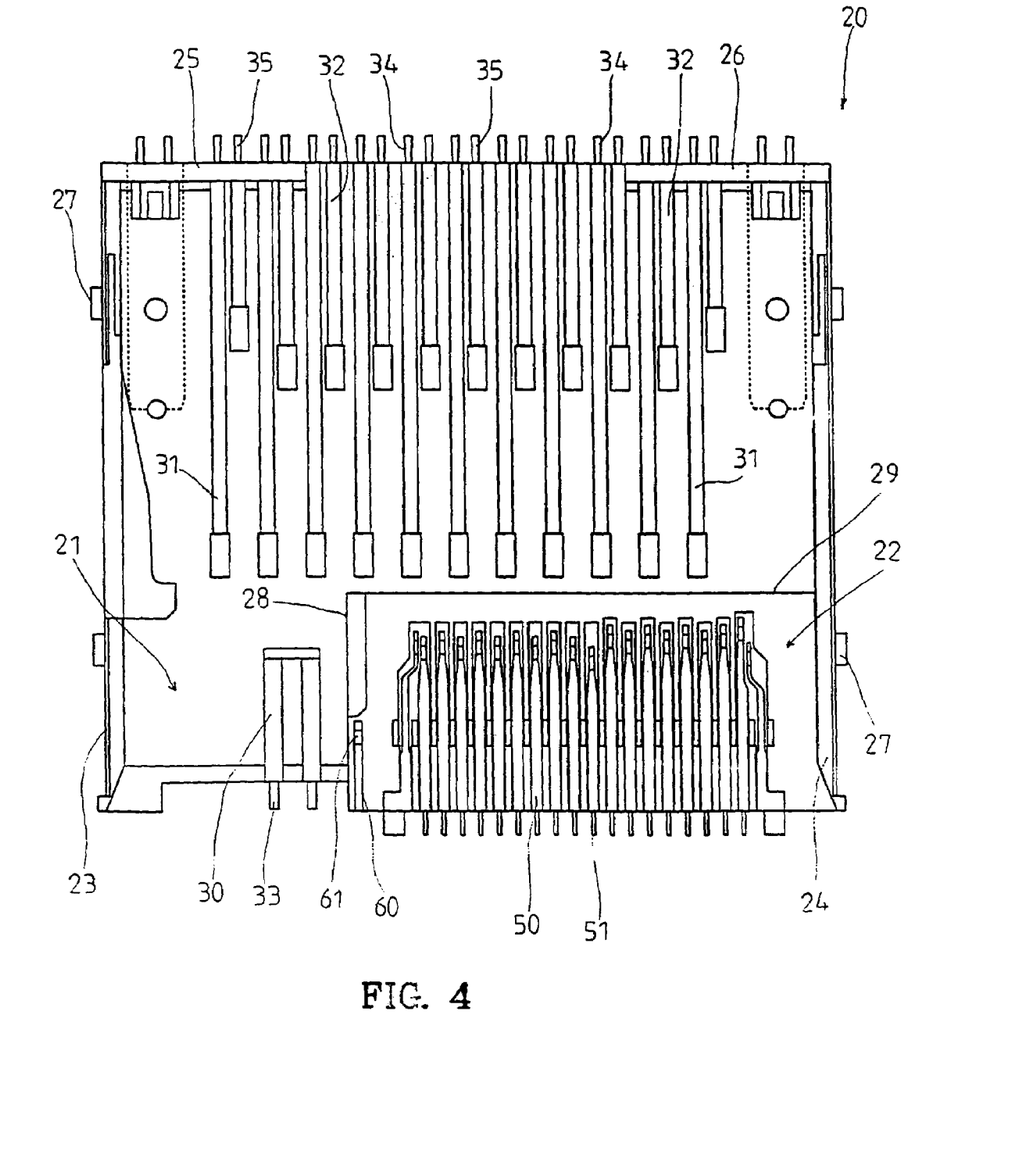
FIG. 4 is a view similar to FIG. 3, wherein a metal cover of the dual card type connector is removed.
Figure 5:
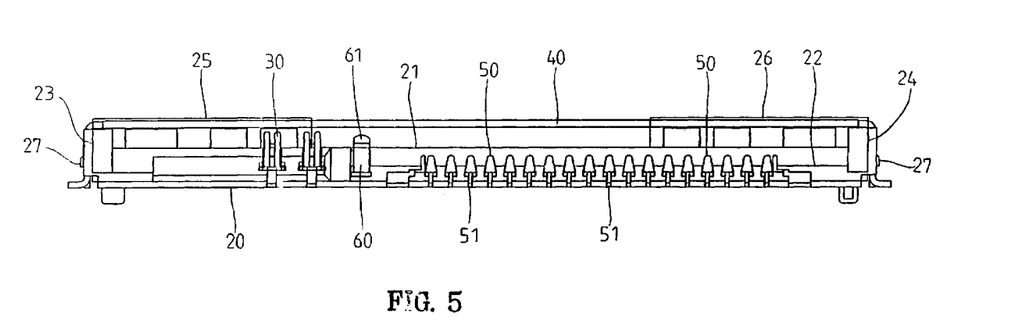
FIG. 5 is a front elevational view of the dual card type connector in accordance with the present invention.
Figure 6:
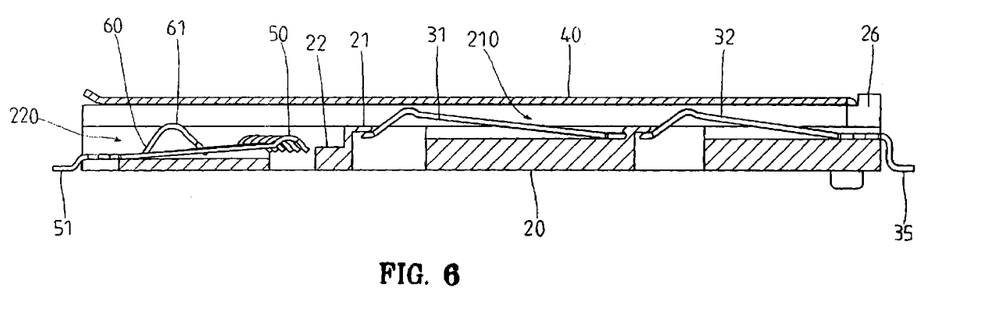
FIG. 6 is a sectional view taken along line A—A in FIG. 3.

FIG. 3 is a plan view of a dual card type connector in accordance with the present invention. FIG. 4 is a view similar to FIG. 3, wherein a metal cover of the dual card type connector is removed. FIG. 5 is a front elevational view of the dual card type connector in accordance with the present invention. FIG. 6 is a sectional view taken along line A—A in FIG. 3.

The dual card type connector in accordance with the present invention generally has a size as an SMC connector shown in FIGS. 1 and 2. In particular, the dual card type connector in accordance with the present invention includes an insulating body 20 having left and right side racks 23 and 24 and rear stop walls 25 and 26. An engaging block 27 (FIGS. 4 and 5) is formed on each of two lateral sides of the insulating body 20 for engaging with a metal cover 40 that is mounted on top of the insulating body 20, forming a first insertion space 210 that has an opening facing a front of the insulating body 20.

Similar to the SMC connector, left side pins 30 and two rows of pins 31 and 32 are mounted on a first surface 21 in, e.g., an upper side of the insulating body 20. Each left side pin 30 has an exposed section 33 exposed to a front side of the insulating body 20. The pins 31 and the pins 32 are alternately disposed. Further, each of the pins 31 and 32 has an exposed section 34, 35 exposed to a rear side of the insulating body 20. An SMC 70 can be plugged into the first insertion space 210 for desired electrical connection, as shown in FIG. 7.

The dual card type connector in accordance with the present invention further includes a second surface 22 that is formed by means of forming a recessed portion in a front section of the upper side of the insulating body 20. A plurality of pins 50 are mounted on the second surface 22 and spaced apart from one another, with each pin 50 having an exposed section 51 exposed to the front side of the insulating body 20. A resilient positioning plate 60 is mounted to a left side of the second surface 22 and has a resilient hook 61.

Figure 9:
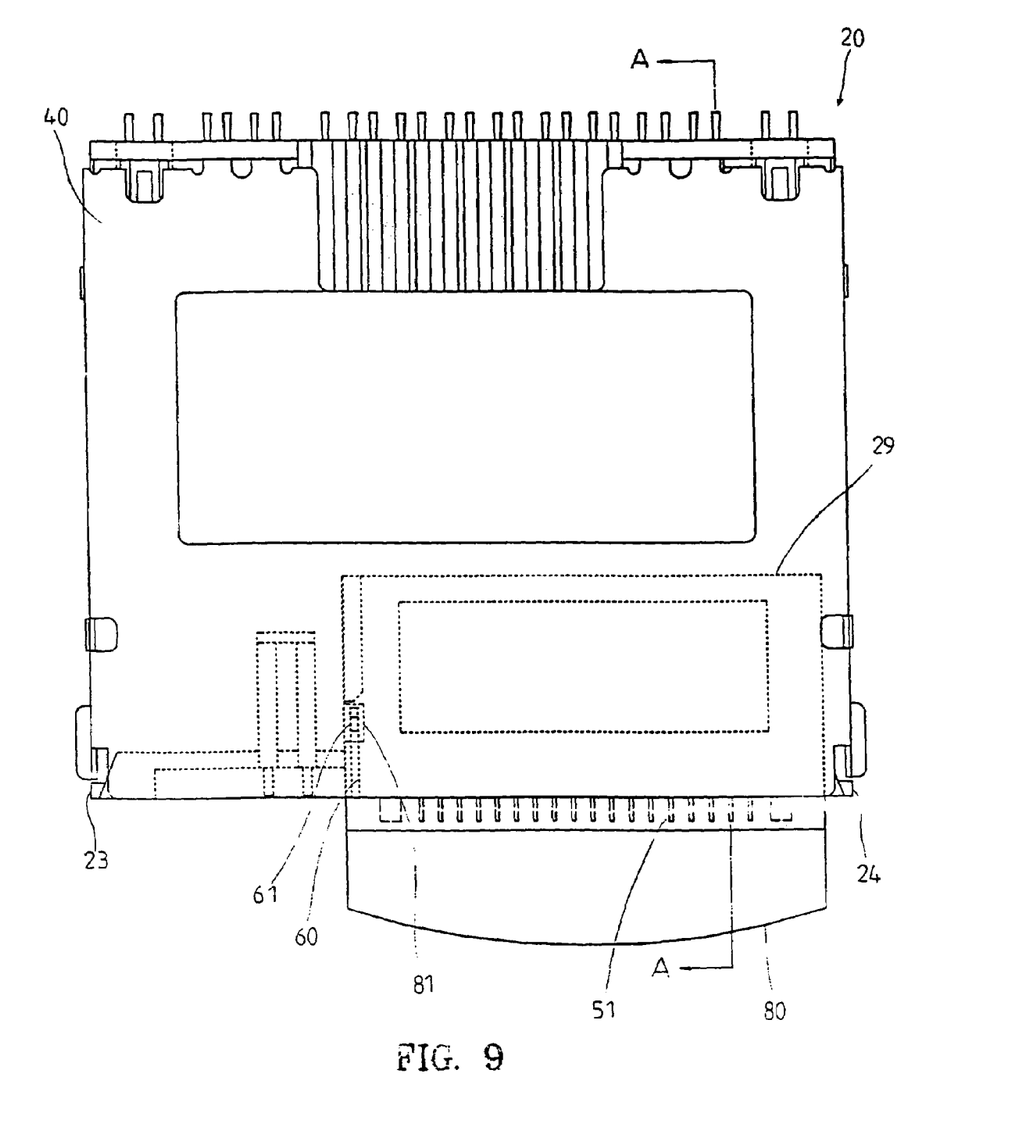

As illustrated in FIGS. 4 through 6, the short, narrow second surface 22 has a left sidewall 28 and a rear end wall 29. Further, the right side of the second surface 22 is contiguous to the right side rack 24 of the insulating body 24. Thus, the second surface 22 and the metal cover 40 together define a second insertion space 220 that has an opening facing the front of the insulating body 20. An XD card 80 can be plugged into the second insertion space 220 for desired electrical connection, as shown in FIG. 9.

Figure 7:
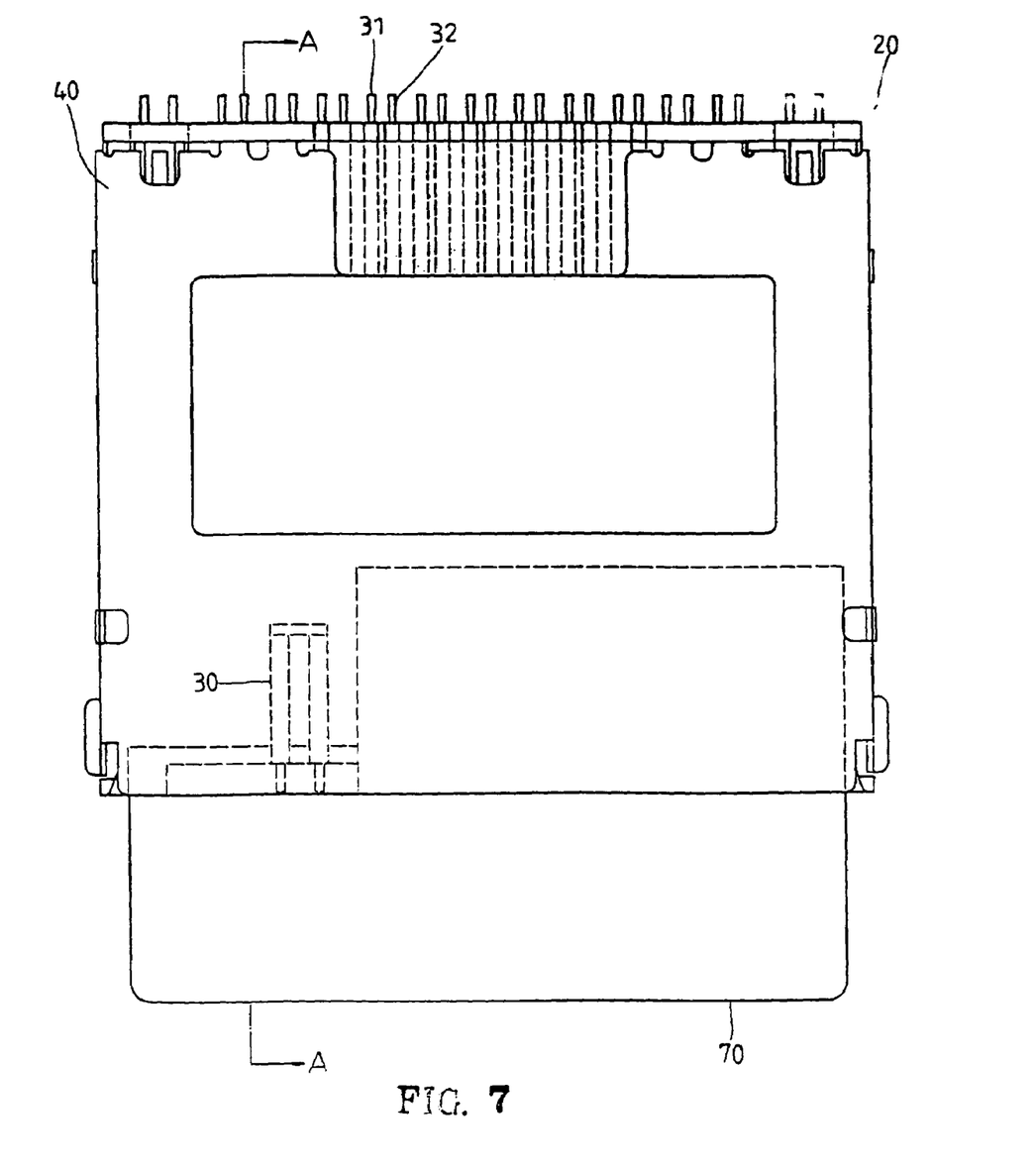
Figure 8:
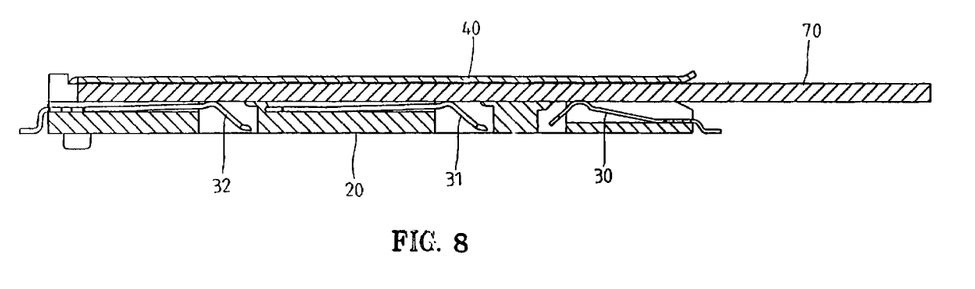
FIG. 8 is a sectional view taken along line A—A in FIG. 7.
Figure 10:
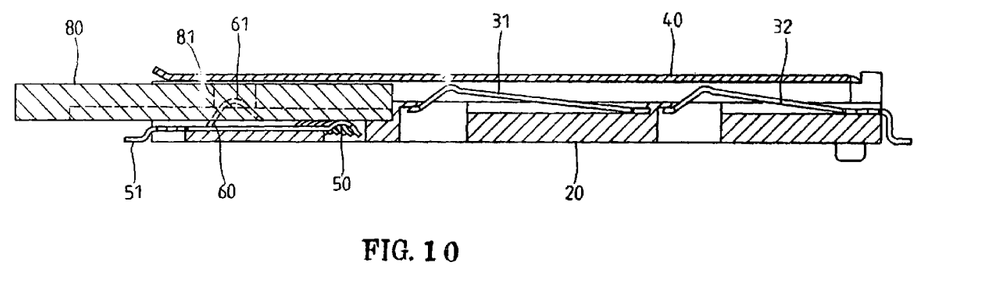
FIG. 10 is a sectional view taken along line A—A in FIG. 9.

An SMC 70 can be plugged into the first insertion space 210, as shown in FIGS. 7 and 8. The contacts of the SMC 70 are in electrical contact with the pins 30, 31, and 32. Alternatively, an XD card 80 can be plugged into the second insertion space 220, as shown in FIGS. 9 and 10. The contacts of the XD card 80 are in contact with the pins 50. Further, the resilient hook 61 is engaged in a positioning notch 81 in the XD card 80, thereby retaining the XD card 80 in place.

Figure 11:
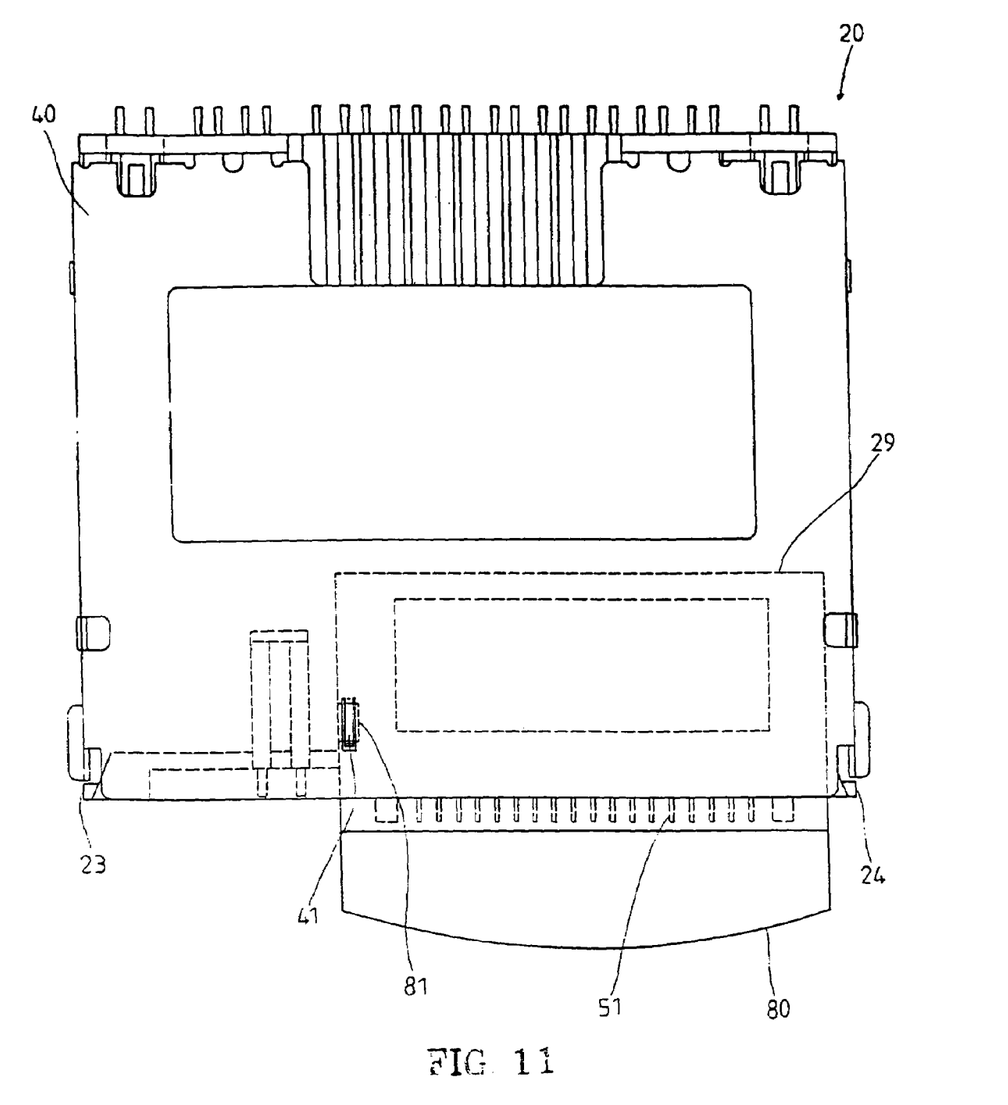
FIG. 11 is a plan view of another embodiment of the dual card type connector and an XD card.
Figure 12:
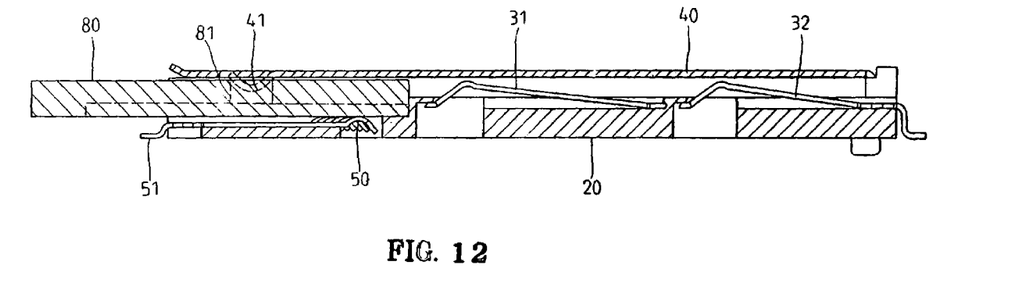
FIG. 12 is a sectional view of the dual card type connector in FIG. 11.

FIGS. 11 and 12 illustrate another embodiment of the dual card type connector in accordance with the present invention, wherein the metal cover 40 is punched downward to form a resilient positioning plate 41 that can be engaged in a positioning notch 81 in the XD card 80 for retaining the XD card 80 in place. The resilient positioning plate 60 in the above embodiment can be omitted.

According to the above, the dual card type connector in accordance with the present invention can be used with a long, wide SMC or a short, narrow XD card (or other short, narrow card) without increasing the size of the connector.

Although the invention has been explained in relation to its preferred embodiment, it is to be understood that many other possible modifications and variations can be made without departing from the scope of the invention as hereinafter claimed.

What is claimed is:

1. A dual card type connector comprising:
   an insulating body including
      a first surface on an upper side thereof, having a front side, and a rear side,
      a plurality of first pins being mounted to the first surface, each of the first pins having an exposed section projecting from the rear side of the insulating body, the insulating body further including
      a second surface on the upper side thereof, recessed downward with respect to the first surface, the second surface bounded by a left sidewall and a rear end wall,
      a plurality of second pins being mounted to the second surface, each of the second pins having an exposed section projecting from the front side of the insulating body,
      the insulating body further including a left side rack, a right side rack, and two spaced rear walls;
   a cover being mounted insulating body,
   a first insertion space, defined by the cover and the first surface of the insulating body together with the right side rack and the left side rack, that has an opening facing the front side of the insulating body for releasable fitting engagement with a smart media card,
   a second insertion space, defined by the cover and the second surface of the insulating body, the second insertion space having an opening facing the front side of the insulating body for releasable engagement with an XD-picture card having a size different from that of the smart media card;
   wherein the second surface being formed by downwardly recessed portion in a front, right section of the upper side of the insulating body in an area covered by the first insertion space, and
      the second insertion space sharing a portion of the first insertion space so that only one card may be inserted at any one time.

2. The dual card type connector as claimed in claim 1, with the second surface further including a right side that is contiguous to the right rack of the insulating body.

3. The dual card type connector as claimed in claim 2, wherein the left sidewall of the second surface includes a positioning plate having an upwardly extending resilient hook positioned to be engaged in a positioning notch in the XD-picture card for retaining the XD-picture card in place.

4. The dual card type connector as claimed in claim 2, wherein the cover further comprises a downwardly extending resilient hook positioned to be engaged in a positioning notch in the XD-picture card for retaining the XD-picture card in place.

* * * * *